United States Patent [19]

Taylor

[11] Patent Number: 4,962,914
[45] Date of Patent: Oct. 16, 1990

[54] FENCE

[76] Inventor: Alva R. Taylor, 206 SE. 10th St., Apt. 101, Dania, Fla. 33004

[21] Appl. No.: 484,772

[22] Filed: Feb. 26, 1990

[51] Int. Cl.⁵ .......................................... E04H 17/14
[52] U.S. Cl. .................................... 256/72; 256/65; 403/381; 403/331
[58] Field of Search ............... 403/381, 331; 256/72, 256/65, 22

[56] References Cited

U.S. PATENT DOCUMENTS

| 72,086 | 12/1967 | Ramsey . | |
|---|---|---|---|
| 263,324 | 8/1882 | Devoe | 256/22 |
| 642,011 | 1/1900 | Sill | 256/65 |
| 1,215,356 | 2/1917 | Emerick | 256/65 X |
| 1,863,995 | 6/1930 | Ponstingl . | |
| 1,898,297 | 9/1931 | Fox . | |
| 2,856,652 | 10/1958 | Colton | 256/72 |
| 3,067,985 | 12/1962 | Cusack | 256/22 |
| 3,800,494 | 4/1974 | Hall | 52/753 |
| 3,933,311 | 1/1976 | Lemelson | 239/276 |
| 4,138,094 | 2/1979 | Thir | 156/67 |
| 4,652,170 | 3/1987 | Lew | 403/331 X |
| 4,723,760 | 2/1988 | O'Sullivan | 256/22 |

FOREIGN PATENT DOCUMENTS 2241985  3/1975  France ............................ 256/65

Primary Examiner—Andrew V. Kundrat
Attorney, Agent, or Firm—Oltman and Flynn

[57] ABSTRACT

This fence assembly has a post, upper and lower horizontal rails with reduced dovetail tongue-and-groove connections to the post for slidable assembly of the rails on the post and vertically aligned paired openings along their respective lengths away from the post, and vertical slats received in these openings and supported from below by the lower rail.

8 Claims, 3 Drawing Sheets

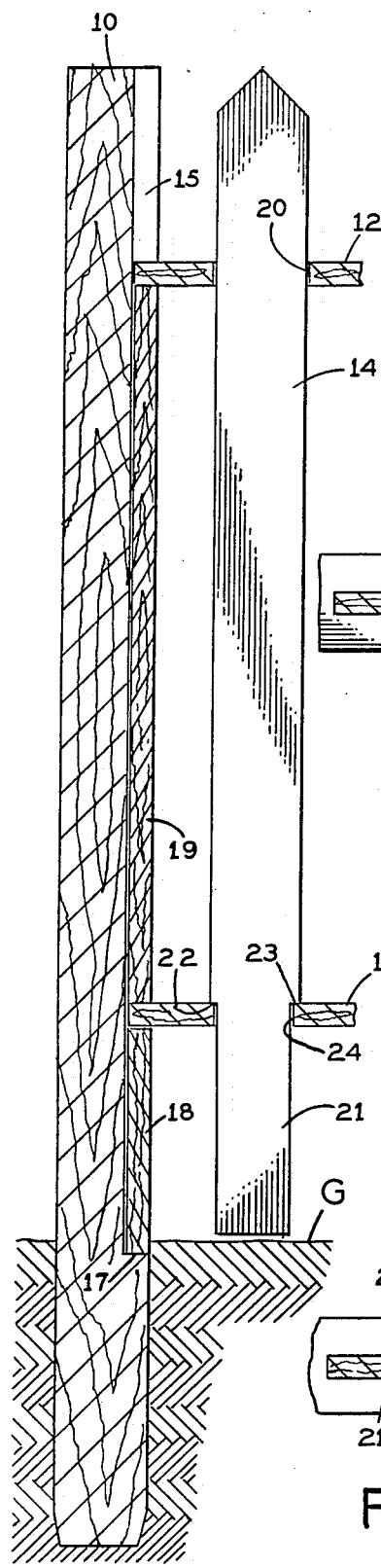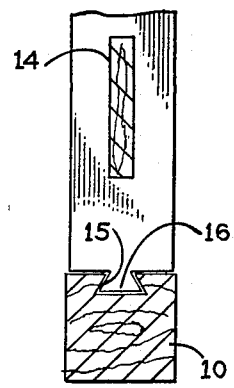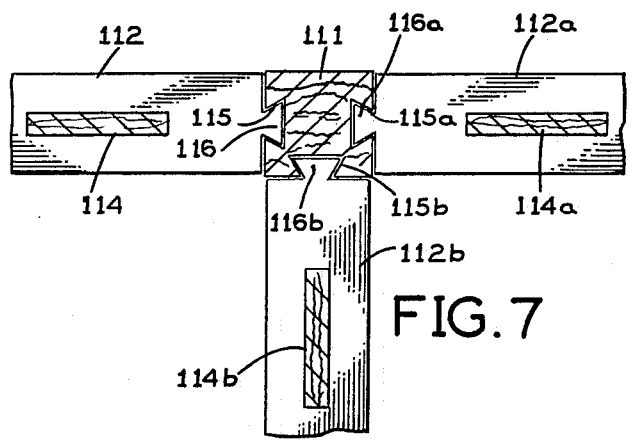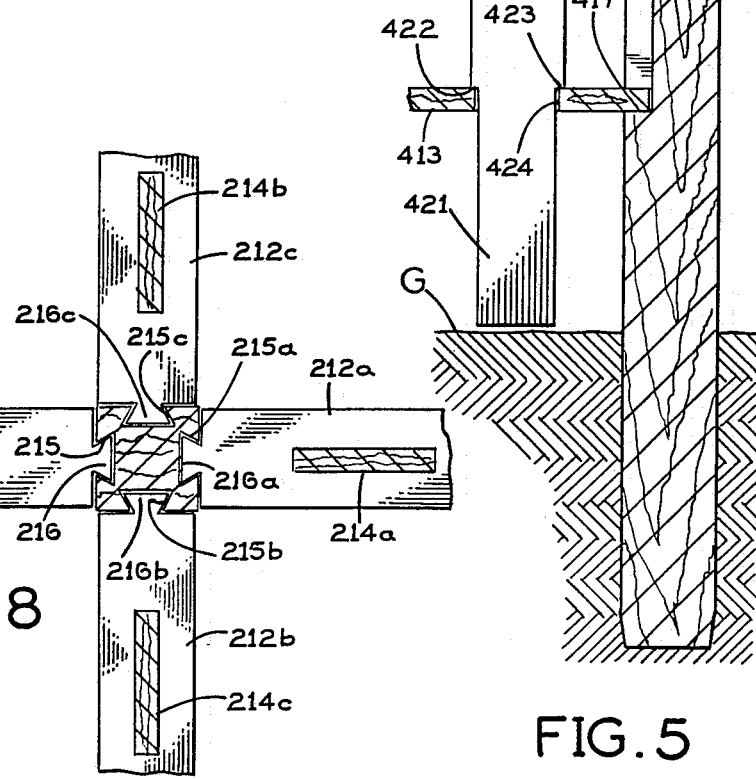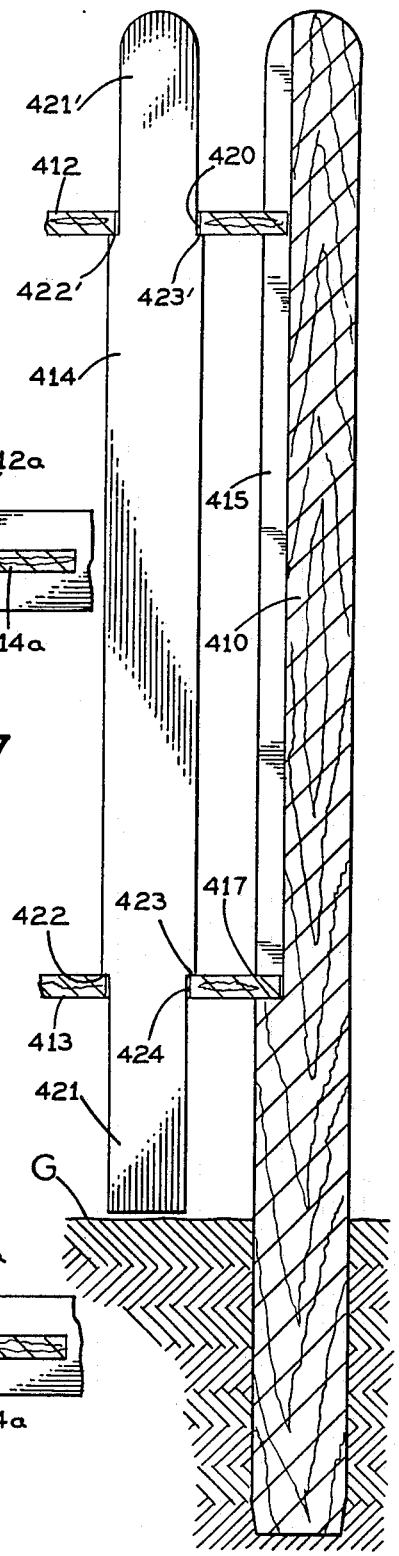

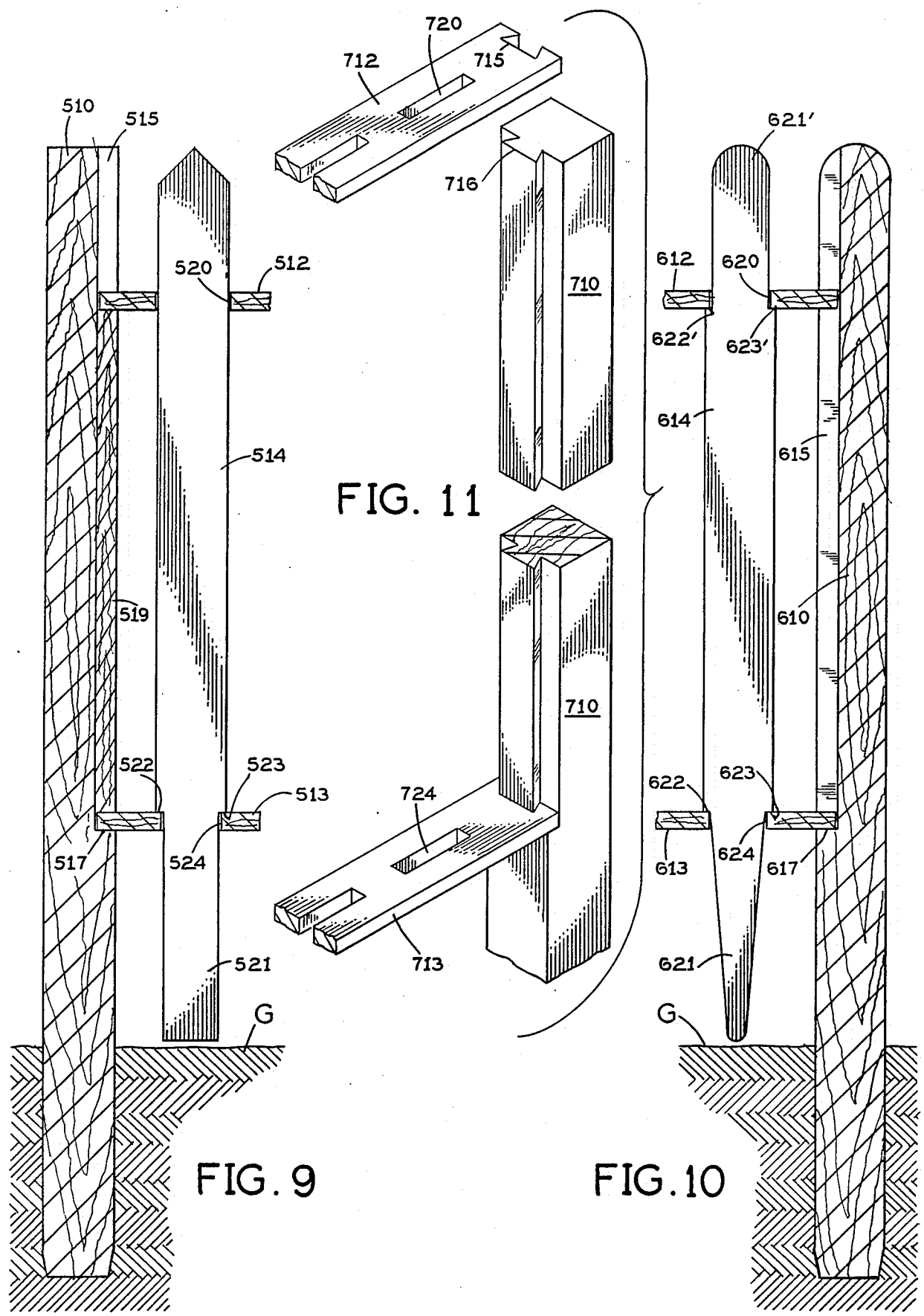

FENCE

SUMMARY OF THE INVENTION

This invention relates to a fence.

A principle object of this invention is to provide a novel fence that can be assembled easily and quickly once the fence posts are in the ground.

Another object of this invention is to provide a novel fence having slidably interlocking parts which obviate the need for nails, staples or other fasteners to complete the installation of the fence.

Another object of this invention is to provide a novel fence composed of pre-fabricated parts that can be quickly assembled at the site and can be readily serviced, when necessary.

Preferably, in accordance with this invention each post of the fence has a longitudinal groove along one or more sides. The number of such grooves depends upon the location of the post in the fence, i.e., whether at one end, or between the ends, or at an outside corner of the fence, or at a juncture between three or four sections of the fence. Each such groove slidably receives a complementary tongue on the adjacent end of lower and upper horizontal rails of the fence. This tongue-and-groove construction provides a horizontal interlock between each rail and the post. The upper and lower rails are supported at predetermined vertical positions on the post. The upper and lower rails have vertically aligned, paired openings which slidably receive corresponding vertical fence slats. Each slat has a reduced lower end segment passing down through the corresponding opening in the lower rail and its presents downwardly-facing horizontal shoulders at the top of the reduced end segment which rest on the lower rail, so the lower rail supports the slats.

Further objects and advantages of this invention will be apparent from the following detailed description of several presently preferred embodiments which are illustrated in the accompanying drawings.

DESCRIPTION OF DRAWINGS

FIG. 4 is a vertical section taken along the line 4—4 in FIG. 1 at an end post of the fence;

FIG. 5 is a view generally like FIG. 4 but showing a different structural arrangement;

FIG. 6 is a horizontal section through the tongue-and-groove connection between the end post in FIG. 1 and a horizontal rail extending from that post;

FIG. 7 is a similar view at a fence post having horizontal rails on three side of it;

FIG. 8 is a similar view at a fence post having horizontal rails on all four sides;

FIG. 9 is a view generally like FIG. 4 and showing another embodiment;

FIG. 10 is a view generally like FIG. 5 and showing another embodiment; and

FIG. 11 is an exploded perspective view showing a modification in which the tongue-and-groove joint between post and rail is provided by a tongue on the post and an end groove in the rail.

Figures 1, 2, 3:
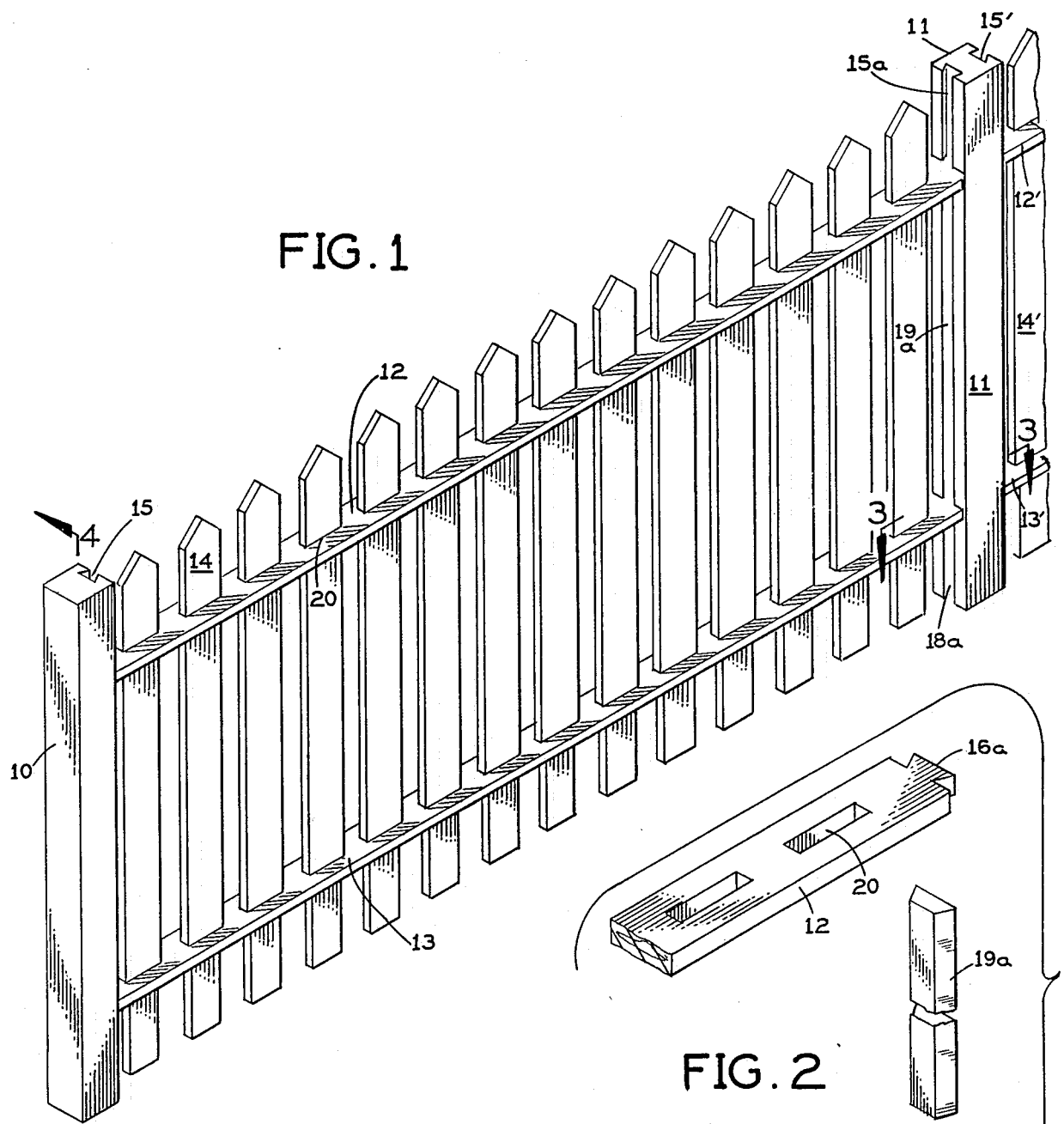
FIG. 1 is a perspective view of an end section of a fence in accordance with the present invention.
FIG. 2 is an exploded perspective view of the components of the fence at one fence post, with parts broken away.
FIG. 3 is a horizontal cross-section taken along the line 3—3 in FIG. 1 at one of the fence posts.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

FIG. 1 shows part of a fence having an end post 10, an intermediate post 11 spaced from the end post, upper and lower horizontal rails 12 and 13 extending between these posts, and vertical slats 14 spaced apart in close succession along the rails 12 and 13.

The end post 10 has a longitudinal groove 15 of truncated triangular cross-section (FIG. 6) along its inner side. This groove is wider at the base of the groove than at its open side on the surface of the post. The upper rail 12 has a dovetail-shaped tongue 16 on the end which is of similar shape and fits snugly but slidably in groove 15. The lower rail 13 has an identical dovetail-shaped end tongue. As shown in FIG. 4, the end post 10 presents an upwardly facing horizontal shoulder 17 at the lower end of its groove 15. This shoulder is slightly below ground level G when the post in the ground. A lower spacer piece 18, with a cross-section substantially complementary to that of the post groove 15, is snugly but slidably received in this groove. The lower end of spacer 18 rests on the post shoulder 17 and the upper end engages the bottom of the tongue on the adjacent end of lower rail 13. An upper spacer piece 19 of the same cross-section has its lower end resting on the end tongue of lower rail 13 and its upper end engaging the bottom of tongue 16 on the adjacent end of upper rail 12.

The fence slat 14 closest to the end post 10 is slidably but snugly received in an opening 20 in the upper rail 12. Both the slat and this opening are of rectangular cross-section in this embodiment but they may have a different cross-sectional shape, if desired. This slat has a lower end segment 21 (FIG. 4) of reduced cross-section and at the upper end of this segment it presents downwardly-facing shoulders 22 and 23 at its opposite ends. The reduced lower end segment 21 of the slat is snugly but slidably received in an opening 24 in the lower rail 13 which is vertically aligned with the just-mentioned opening 20 in upper rail 12. The shoulders 22 and 23 on the slat engage the top of rail 13 at the opposite ends of this opening.

Each additional slat 14 is received in the same manner in vertically aligned, paired openings 20 and 24 in the upper and lower rails 12 and 13, respectively.

As shown in FIGS. 1 and 3, there is a similar structural arrangement of upper and lower rails and vertical slats on the side of the next post 11 facing the end post 10. Elements of this arrangement have the same reference numerals, with an a suffix added, as those just described and the detailed description of these features not be repeated.

This section of the fence is assembled by sliding the lower spacer pieces 18 and 18a down into the corresponding grooves 15 and 15a in posts 10 and 11, after which the lower rail 13 is put in place by sliding its dovetail end tongues 16 and 16a down along these grooves until they rest on the spacer pieces 18 and 18a. Then the upper spacer pieces 19 and 19a are inserted down into the corresponding fence post grooves 15 and 15a until they engage the top of the end tongues 16 and 16a of the lower rail 13. Then the upper rail is put in place by sliding its end tongues down along the post grooves 15 and 15a until they engage the upper ends of spacer pieces 19 and 19a. Finally, the slats 14 are inserted down through the respective openings 20 in top rail 12 and down through the aligned openings 24 in bottom rail 13 until the downwardly-facing shoulders 22 and 23 of each slat engages the top of the bottom rail. These steps can be performed readily by relatively unskilled workers.

The opposite side of post 11 has a similar groove 15' which snugly but slidably receives complementary dovetail end tongues on the upper and lower rails 12' and 13' in the next post-to-post section of the fence. The slats 14' in this section of the fence are the same as the slats 14 in the endmost section, and the post groove 15' receives inserts like the inserts 18a and 19a in the groove 15a on its opposite side.

The fence has an identical construction at each successive post where the neighboring sections of the fence are aligned with each other on opposite sides of the post.

FIG. 7 shows a different arrangement having a fence post 111 at the juncture between three fence sections, two aligned with each other and the third extending at right angles to them. The upper rails of these adjoining sections of the fence are shown at 112, 112a and 112b. These rails have respective dovetail-shaped end tongues 116, 116a and 116b which are snugly but slidably received in corresponding complementary longitudinal grooves 115, 115a and 115b in the adjacent sides of the post. These grooves receive upper and lower inserts like the inserts 18 and 19. The vertical slats 114, 114a and 114b in these three sections of the fence are identical to the slats 14 in FIGS. 1–4 and they coact with the upper and lower rails of the fence in the same manner.

FIG. 8 shows another arrangement having a fence post 211 at the juncture between four fence sections which form four right-angled corners at this post. The upper rails 212, 212a, 212b and 212c of these four sections of the fence have respective dovetail end tongues 216, 216a, 216b and 216c which are snugly but slidably received in corresponding grooves 215, 215a, 215b and 215c in post 211. Each groove in fence post 211 receives upper and lower inserts like the inserts 18 and 19, and the vertical slats 214, 214a, 214b and 214c of these fence sections are identical to slat 14 in FIGS. 1–4 and coact with the upper and lower rails of the fence in the manner already disclosed in detail.

FIG. 5 shows another embodiment of the present invention having an end post 410 with a vertical groove 415 on one side like the groove 15 in FIGS. 4 and 6. The upper rail 412 has a complementary end tongue (like the tongue 16 in FIG. 6) which fits snugly but slidably in groove 415. Likewise, the lower rail 413 has an identical end tongue that fits in this groove. An upwardly-facing, horizontal, internal shoulder 417 at the lower end of groove 415 is spaced above ground when the post is in the ground. The tongue on the end of lower rail 413 rests directly on the post shoulder 417.

Each vertical slat 414 of the fence has a reduced lower end segment 421 that extends down through an opening 424 in lower rail 413. At the upper end of segment 421, the slat presents downwardly-facing shoulders 422 and 423 which engage the top of lower rail 413 at opposite ends of this opening.

Each slat 414 also has a similarly reduced upper end segment 421' that extends up through an opening 420 in upper rail 412. At the lower end of segment 421 the rail presents upwardly-facing, horizontal shoulders 422' and 423' which engage the bottom of upper rail 412 at opposite ends of this opening.

With this arrangement, the post 410 directly supports the lower rail 413 at one end, the lower rail 413 supports the slats 414 from below, the slats 414 support the upper rail 412 from below, and the post 410 merely locates the tongued end of the upper rail 412.

To assemble a post-to-post fence section of the type shown in FIG. 5, the first step is to insert each dovetail end tongue of the lower rail 413 into the upper end of the complementary groove 415 in the corresponding post 410 and slide the lower rail down to the position shown, with each end tongue resting on the upwardly-facing shoulder 417 in this post groove. Next, the reduced lower end segments 421 of the slats 414 are inserted down through the corresponding openings 424 in the lower rail until the downwardly-facing shoulders 422 and 423 of each slat engage the top of this rail. Then the upper rail 412 is slipped down over the reduced upper end segments 421' of the slats 414 and the dovetail end tongues on the upper rail 412 are slid down along the post grooves 415 until the upper rail rests on the upwardly-facing shoulders 422' and 423' of each slat. This completes the assembly.

FIG. 9 shows another embodiment of the invention in which the dovetail end tongue on the lower rail 513 of the fence rests directly on an upwardly-facing horizontal shoulder 517 on the post 510. This shoulder is spaced above ground level. An upper spacer member 519 is slidably received in groove 515 in the post and it supports the upper rail 512 from below in the same manner as the upper spacer member 19 in the embodiment of FIGS. 1–4.

FIG. 10 shows another embodiment which is basically like the embodiment of FIG. 5 except that the lower end segment 621 of each slat 614 is tapered or wedge-shaped and has a tight fit in the corresponding opening 624 in lower rail 613 so that when properly inserted in this opening the slat extends vertically up from the lower rail and is aligned with the posts 610. If desired, the lower end segment of each slat in any of the preceding embodiments may be wedge-shaped to have a tight fit in the corresponding lower rail. The slats could be in double rows or slanted if desired.

FIG. 11 shows a modified arrangement of the tongue-and-groove joint between a post and each adjoining rail. The dovetail-shaped tongue 716 is on the post 710 and the rail 712 has a complementary end groove 715 to slidably receive this tongue when the rail is slid onto the post. This tongue-and-groove joint may be provided on any of the preceding embodiments of the invention.

From the foregoing it will be evident that the present invention enables a fence to be erected quickly and easily once the fence posts are in the ground. The upper and lower rails of each post-to-post section of the fence interlock horizontally with the posts due to the tongue-and-groove joints between them. The above-ground elevation of the upper and lower rails is determined by the fence posts, as described. The location of the vertical slats of the fence is determined by the paired, vertically aligned openings in the upper end and lower rails.

I claim:

1. In a fence, the combination of:
   a fence post;

at least one horizontal fence rail extending away from said post and having a plurality of openings in succession along its length away from said post;

means on said post and said rail providing a tongue- and groove-joint between them which enables the slidable adjustment of said rail along said post;

means for supporting said rail at a predetermined location along said post;

and a plurality of vertical fence slats slidably received individually in said openings in the rail and extending down through said rail, each of said slats having a tapered lower end segment wedged into the corresponding opening in said rail.

2. In a fence, the combination of:

a fence post;

at least one horizontal fence rail extending away from said post and having a plurality of openings in succession along its length away from said post;

means on said post and said rail providing a tongue-and-groove joint between them which enables the slidable adjustment of said rail along said post;

means for supporting said rail at a predetermined location along said post;

and a plurality of vertical fence slats slidably received individually in said openings in the rail and extending down through said rail, each of said slats having a reduced lower end segment passing down through the corresponding opening in said rail and presenting downwardly-facing shoulders at the top of said lower end segment which rest on said rail, and each of said slats having a tapered lower end segment wedged into the corresponding opening in said rail.

3. In a fence, the combination of:

a fence post having a longitudinal groove therein which is open along one side of the post;

at least one horizontal fence rail having an end tongue slidably received in said groove, said rail extending away from said post and having a plurality of openings in succession along its length away from said post;

means for supporting said end tongue of said rail at a predetermined location along said groove in the post;

and a plurality of vertical fence slats slidably received individually in said openings in the rail and extending down through said rail, each of said slats having a tapered lower end segment wedged into the corresponding opening in said rail.

4. In a fence, the combination of:

a fence post having a longitudinal groove therein which is open along one side of the post;

a horizontal lower fence rail having an end tongue slidably received in said groove, said lower rail extending away from said post and having a plurality of openings in succession along its length away from said post;

means for supporting said end tongue of said lower rail at a predetermined location along said groove in the post;

a horizontal upper fence rail having an end tongue slidably received in said groove in the post at a location spaced above said lower rail, said upper rail extending away from said post and having a plurality of openings in succession along its length which are vertically aligned with said openings in said lower rail;

and a plurality of vertical fence slats slidably received individually in said aligned openings in said upper and lower rails and extending down through said rails, each of said slats having a reduced lower end segment passing down through the corresponding opening in said lower rail, said reduced lower end segment of each of said slats being tapered and wedged into the corresponding opening in said lower rail.

5. In a fence, the combination of:

a fence post having a longitudinal groove therein which is open along one side of the post;

a horizontal lower fence rail having an end tongue slidably received in said groove, said lower rail extending away from said post and having a plurality of openings in succession along its length away from said post;

means for supporting said end tongue of said lower rail at a predetermined location along said groove in the post;

a horizontal upper fence rail having an end tongue slidably received in said groove in the post at a location spaced above said lower rail, said upper rail extending away from said post and having a plurality of openings in succession along its length which are vertically aligned with said openings in said lower rail;

a plurality of vertical fence slats slidably received individually in said aligned openings in said upper and lower rails and extending down through said rails, each of said slats having a reduced lower end segment passing down through the corresponding opening in said lower rail;

said post presenting an upwardly-facing horizontal shoulder at the lower end of said groove which directly engages said end tongue of said lower rail from below;

and each of said slats having a reduced upper end segment passing up through the corresponding opening in said upper rail and presenting upwardly-facing horizontal shoulders at the bottom of said upper end segment which support said upper rail from below.

6. In a fence, the combination of:

a fence post having a longitudinal groove therein which is open along one side of the post;

a horizontal lower fence rail having an end tongue slidably received in said groove, said lower rail extending away from said post and having a plurality of openings in succession along its length away from said post;

means for supporting said end tongue of said lower rail at a predetermined location along said groove in the post;

a horizontal upper fence rail having an end tongue slidably received in said groove in the post at a location spaced above said lower rail, said upper rail extending away from said post and having a plurality of openings in succession along its length which are vertically aligned with said openings in said lower rail;

and a plurality of vertical fence slats slidably received individually in said aligned openings in said upper and lower rails and extending down through said rails, each of said slats having a reduced lower end segment passing down through the corresponding opening in said lower rail, each of said slats presenting downwardly-facing shoulders at the top of said lower end segment which rest on said lower rail.

7. A fence according to claim 6 wherein:

said post presents an upwardly-facing horizontal shoulder at the lower end of said groove;

said means for supporting said end tongue of said lower rail is a first spacer piece slidably received in said groove in the post between said shoulder and said end tongue of said lower rail;

and further comprising:

a second spacer piece slidably received in said groove in the post and extending up from said end tongue of said lower rail to said end tongue of said upper rail and supporting said end tongue of said upper rail from below.

8. A fence according to claim 6 wherein:

said post presents an upwardly-facing horizontal shoulder at the lower end of said groove which directly engages said end tongue of said lower rail from below.

and further comprising:

a spacer piece slidably received in said groove in said post between said end tongue on said lower rail and said end tongue on said upper rail to support said upper rail from below.

* * * * *